United States Patent
Lin

(10) Patent No.: US 12,244,429 B2
(45) Date of Patent: Mar. 4, 2025

(54) METHODS FOR COMMUNICATING BETWEEN A TERMINAL AND A BASE STATION, CORRESPONDING TERMINAL, BASE STATION AND COMPUTER PROGRAM

(71) Applicant: ORANGE, Issy-les-Moulineaux (FR)

(72) Inventor: Hao Lin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 186 days.

(21) Appl. No.: 17/606,346

(22) PCT Filed: Apr. 20, 2020

(86) PCT No.: PCT/EP2020/061010
§ 371 (c)(1),
(2) Date: Oct. 25, 2021

(87) PCT Pub. No.: WO2020/216720
PCT Pub. Date: Oct. 29, 2020

(65) Prior Publication Data
US 2022/0231799 A1    Jul. 21, 2022

(30) Foreign Application Priority Data
Apr. 26, 2019  (FR) ..................... 1904462

(51) Int. Cl.
*H04L 1/1867*   (2023.01)
*H04L 1/1607*   (2023.01)
(Continued)

(52) U.S. Cl.
CPC .......... *H04L 1/1874* (2013.01); *H04L 1/1628* (2013.01); *H04W 28/0205* (2013.01); *H04W 72/23* (2023.01)

(58) Field of Classification Search
None
See application file for complete search history.

(56) References Cited

U.S. PATENT DOCUMENTS

| 2009/0059891 A1 | 3/2009 | Sakoda et al. | |
| 2015/0131475 A1* | 5/2015 | Van Phan | H04W 8/26 370/254 |

(Continued)

OTHER PUBLICATIONS

International Search Report dated May 14, 2020 for corresponding International Application No. PCT/EP2020/061010, Apr. 20, 2020.
(Continued)

*Primary Examiner* — Jason E Mattis
*Assistant Examiner* — Bao G Nguyen
(74) *Attorney, Agent, or Firm* — David D. Brush; Westman, Champlin & Koehler, P.A.

(57) ABSTRACT

A method for managing a communication between a base station and a terminal. The terminal is associated with at least one memory having at least two storage areas. The terminal implements: at least one step of storing, in one of the storage areas, a state representative of a transmission, by the base station, of at least one current data packet and control information associated with the current data packet, called current transmission, the storage area being identified by a storage area indicator borne by the control information associated with the current data packet; and transmission, to the base station, of all states stored in the storage areas, when the terminal is authorized to emit.

12 Claims, 3 Drawing Sheets

(51) Int. Cl.
*H04W 28/02* (2009.01)
*H04W 72/23* (2023.01)

(56) References Cited

U.S. PATENT DOCUMENTS

| | | | | |
|---|---|---|---|---|
| 2016/0253092 | A1* | 9/2016 | Goldberg | G06F 3/064 |
| | | | | 711/114 |
| 2017/0373802 | A1* | 12/2017 | Bergström | H04L 1/0027 |
| 2018/0279168 | A1 | 9/2018 | Jheng et al. | |
| 2019/0199793 | A1* | 6/2019 | Sarin | H04L 63/126 |
| 2020/0351060 | A1* | 11/2020 | Liang | H04W 16/14 |

OTHER PUBLICATIONS

Written Opinion of the International Searching Authority dated May 14, 2020 for corresponding International Application No. PCT/EP2020/061010, filed Apr. 20, 2020.

"LTE; Physical layer procedures for shared spectrum channel access", Technical Specification, 3GPP TS 37.213 version 15.0.0 Release 15, ETSI TS 137 213 V15.0.0 (Jul. 2018).

English translation of the Written Opinion of the International Searching Authority dated May 26, 2020 for corresponding International Application No. PCT/EP2020/061010, filed Apr. 20, 2020.

"3rd Generation Partnership Project; Technical Specification Group Radio Access Network; Study on NR-based Access to Unlicensed Spectrum". (Release 16), 3GPP A Global Initiative, Valbonne, France, Nov. 2018, 120 pages.

\* cited by examiner

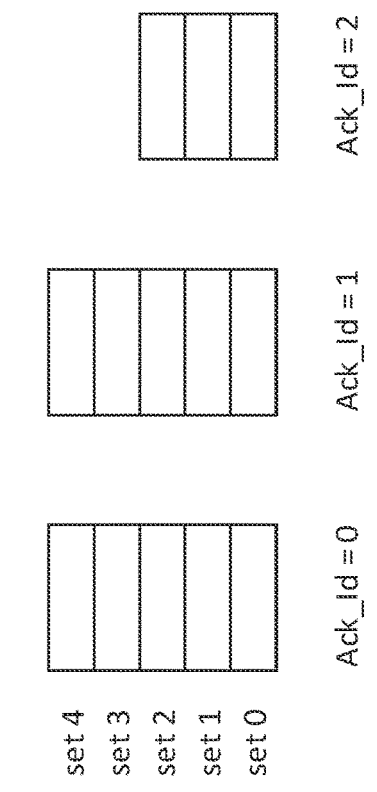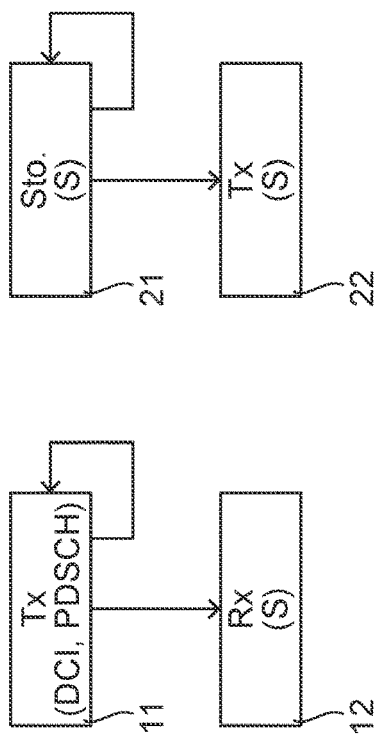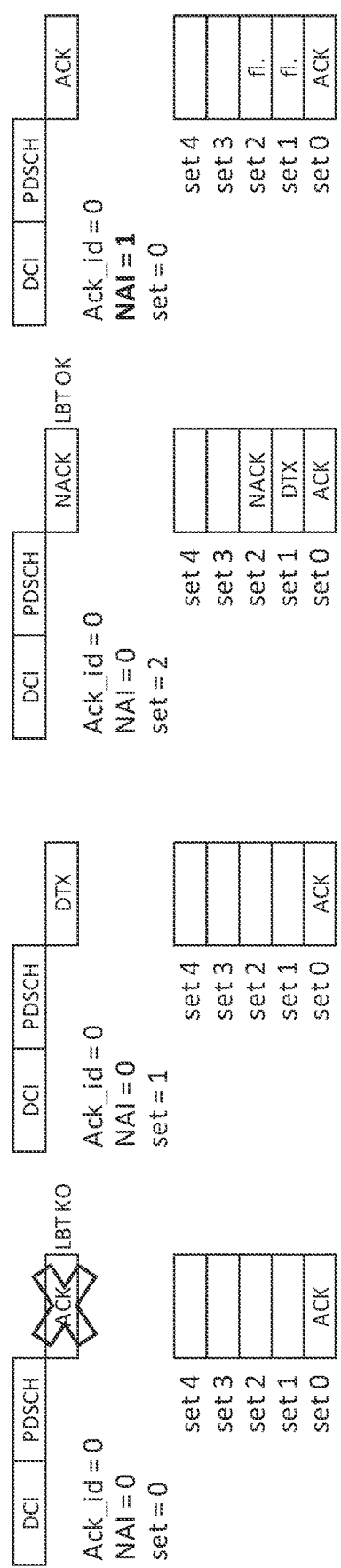

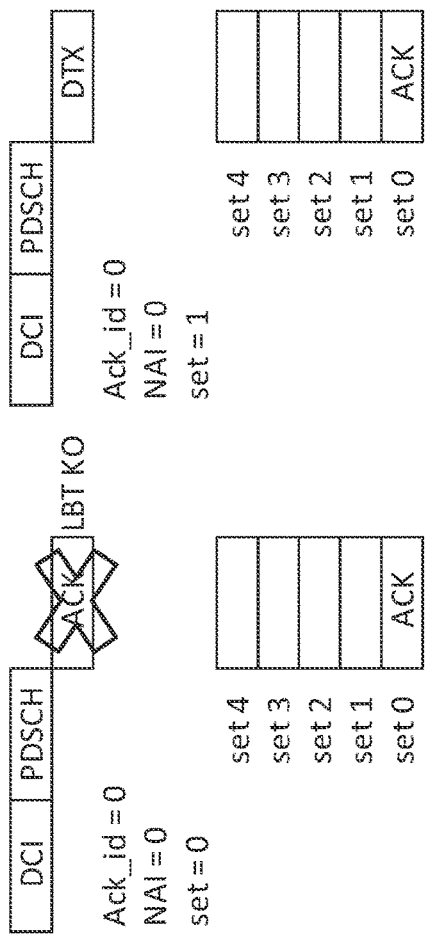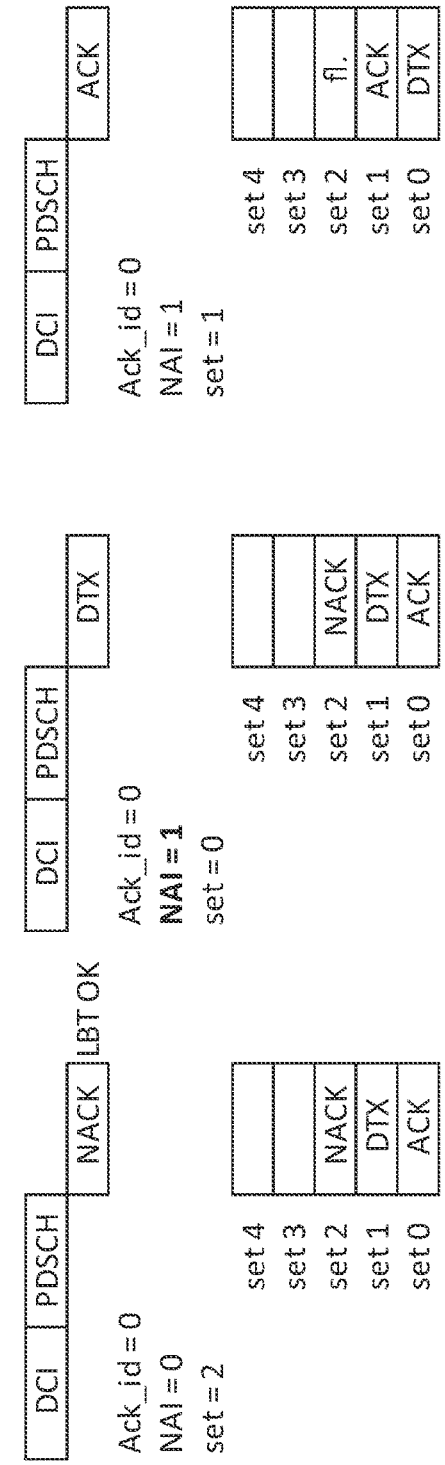

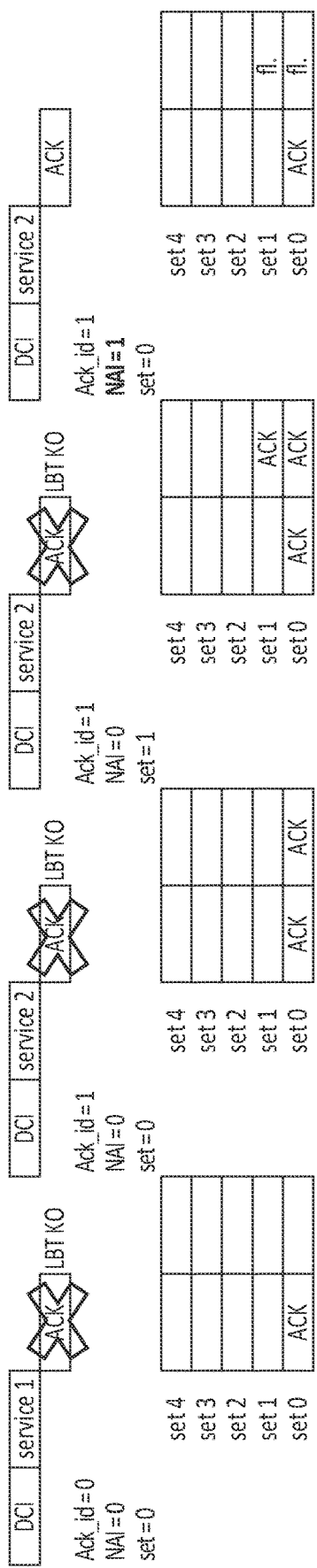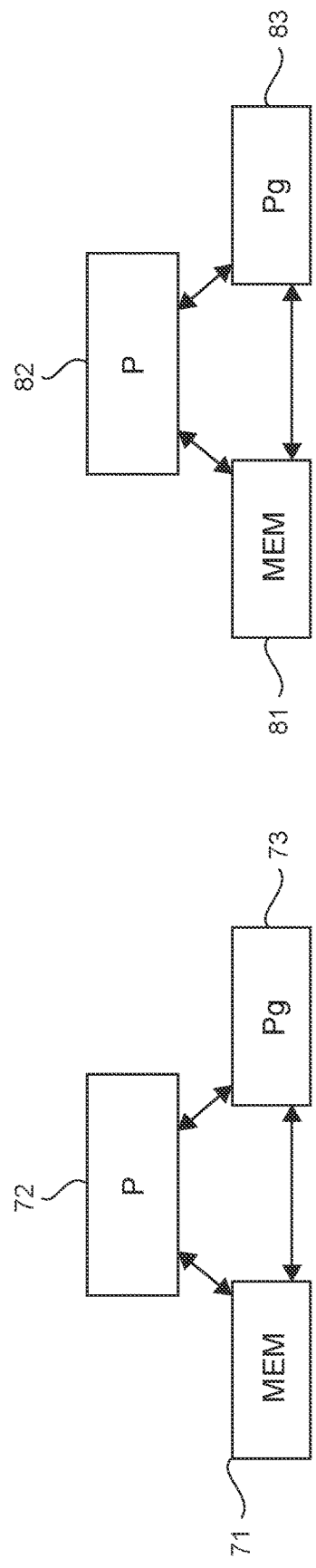

METHODS FOR COMMUNICATING BETWEEN A TERMINAL AND A BASE STATION, CORRESPONDING TERMINAL, BASE STATION AND COMPUTER PROGRAM

CROSS-REFERENCE TO RELATED APPLICATIONS

This Application is a Section 371 National Stage Application of International Application No. PCT/EP2020/061010, filed Apr. 20, 2020, which is incorporated by reference in its entirety and published as WO 2020/216720 A1 on Oct. 29, 2020, not in English.

1. FIELD OF THE INVENTION

The field of the invention is that of telecommunications.

More specifically, the invention relates to the communications between a terminal and a base station, in particular in unlicensed frequency bands.

The invention finds in particular, and not exclusively, applications in the field of 5G (NR for "New Radio"), for communications on unlicensed frequency bands ("NR-U" for "NR-based access to unlicensed spectrum").

2. PRIOR ART

In order to increase the bandwidth and therefore the transmission rate in a communication network, the use of unlicensed frequency bands, that is to say, not allocated to a particular telephone operator or to a specific use, is developing.

However, the use of these unlicensed frequency bands has some drawbacks. Indeed, such frequency bands being usable by all mobile telephone operators, their accessibility is reduced and a certain lapse of time can pass before a base station or a terminal can transmit data.

In order to facilitate the access to a channel in an unlicensed frequency band, access protocols have been proposed, such as the LBT ("Listen Before Talk") access protocol, and in particular its version called "category 4" version.

According to this version, when an equipment wishes to emit a signal in a channel belonging to an unlicensed frequency band, it previously carries out a first listening to the channel for a predetermined period (for example 34 ys). If the channel is busy, the emitter equipment continues listening to the channel, until the channel is detected as not busy or inactive ("idle").

For example, determining the occupancy of a channel is based on an energy measurement. The emitter equipment estimates the energy received on this channel and compares it to a predefined threshold. If the received energy exceeds this threshold, the channel is considered as busy. Otherwise, it is considered as idle.

The emitter equipment checks that the channel remains inactive for a predetermined period (for example 34 μs). Once this time has elapsed, the emitter equipment draws a random value ("backoff") from a predefined range (for example an integer comprised between 5 and 15), and checks for each counter value whether the channel remains idle, counting down from the drawn value.

For example, each counter value is associated with a step of 9 ρs. Thus, if the channel remains idle for a period of 9 ρs, the counter value is decremented by 1.

If during the countdown, the channel is again busy, the emitter equipment retains the current value of the counter and continues listening to the channel, until detecting that the channel is free again. The emitter equipment checks again that the channel remains idle for a predetermined period (for example 34 ρs), then resumes the countdown from the last counter value.

When the countdown is complete (i.e. counter value equal to 0), the emitter equipment can start transmitting data. The transmission time is called COT ("Channel Occupancy Time").

According to the LBT access protocol, communications can therefore be delayed as long as the channel is busy.

Moreover, solutions have also been proposed to confirm the reception by user equipment (UE) of data transmitted by a downlink base station. This technique is in particular known under the name "HARQ-ACK feedback" ("Hybrid Automatic Repeat reQuest-ACKnowledgment").

For example, as described in the document "LTE; Physical layer procedures for shared spectrum channel access (3GPP TS 37.213 version 15.0.0 Release 15)", when a base station wishes to transmit data to user equipment, it transmits in particular data on the PDSCH ("Physical Downlink Shared Channel") and control information (DCI for "Downlink Control Information").

The control information bears information relating to the reception of the data, such as the time/frequency resource or the coding and modulation scheme used to transmit the data. Such control information may also carry information relating to the time/frequency resource to be used by the user equipment to indicate whether the data has been decoded, also called time/frequency resource for "feedback".

For example, the user equipment sends an ACK type message on the resource for the feedback if the data packet is correctly decoded, or a NACK type message otherwise.

Since the base station allocates the time/frequency resource to be used by the user equipment for the feedback, the base station can read the message it receives on this resource to check if the user equipment has decoded the data.

If the base station receives an ACK type message associated with a current data packet, it can consider that the current data packet has been correctly received.

If the base station receives a NACK type message associated with a current data packet, it can retransmit the current data packet, possibly with different redundancy data (RV or "Redundancy values"). In this manner, the user equipment can reconstruct the current data packet using the initial transmission and re-transmission.

However, if the base station does not receive any message on the time/frequency resource allocated for the feedback, the base station considers that the communication has been interrupted (DTX for "Discontinuous transmission"). The base station assumes that the user equipment has not received the control information DCI, therefore has not been aware of the transmission of a data packet and has not attempted to decode it. The base station then decides to transmit the control information DCI again with a different coding, as well as to retransmit the data packet on the PDSCH, possibly with a different modulation and coding scheme.

However, as previously indicated for the communications on unlicensed frequency bands (for example NR-U), according to the LBT access protocol, some communications may be delayed as long as the channel is busy.

Thus, the transmission by the user equipment of a message to indicate whether the data packet has been decoded can be delayed as long as the channel is busy. In particular, user equipment may have decoded a data packet, and wish to transmit an ACK type message on the resource allocated for the feedback. In order to be able to transmit the ACK message in an unlicensed frequency band, the user equipment runs the LBT access protocol. As long as the channel is busy, transmission of the ACK message is prohibited. The base station, not receiving any message on the time/frequency resource allocated for the feedback, will consider that the communication has been interrupted (DTX). The base station will transmit the control information DCI and the data packet again, thus causing a spectral efficiency loss.

There is therefore a need for a technique allowing managing the communications between user equipment, also called a terminal, and a base station, in particular in unlicensed frequency bands, not having all or part of the drawbacks of the prior art.

3. DISCLOSURE OF THE INVENTION

The invention proposes, according to one embodiment, a method for managing a communication between a base station and a terminal. In particular, such a method is implemented at a terminal.

According to this embodiment, the terminal is associated with at least one memory comprising at least two storage areas, and implements:
- at least one step of storing, in one of said storage areas, a state representative of a transmission, by the base station, of at least one current data packet and control information associated with said current data packet, called current transmission, said storage area being identified by a storage area indicator borne by said control information associated with said current data packet,
- the transmission, to said base station, of all states stored in the storage areas, when said terminal is authorised to emit.

For example, the state representative of a transmission belongs to the group comprising:
- the data packet has been decoded (for example of ACK type);
- the data packet has not been decoded (for example of NACK type);
- the control information has not been received (for example of DTX type).

The proposed solution thus allows storing in memory the states representative of the transmissions of data packets from the base station to the terminal, as long as the terminal is not authorised to emit.

In particular, the proposed solution allows improving the technique of "HARQ-ACK feedback".

When the terminal is authorised to emit, for example when the channel is considered as idle following the progress of the LBT access protocol, the terminal transmits to the base station the history of the states representative of the transmissions. In this manner, the base station receives information about the previous transmissions, and can decide whether it is desirable to retransmit some data packets (in particular the data packets associated with a NACK or DTX state).

The spectral efficiency of the communications is thus optimised by avoiding the systematic retransmission of data packets for which the base station has not received a message from the terminal indicating whether the data has been decoded.

In particular, for a current transmission, if the base station has not received a message indicating whether the data has been decoded on a time/frequency resource allocated for the feedback, the base station can determine, during a following transmission:
- whether the terminal has not actually received the control information for the current transmission (and returned the control information with possibly an adapted coding rate and the current data packet with an adapted coding and modulation scheme), or
- whether the terminal has received the control information for the current transmission, but could not send a message indicating whether the data has been decoded because the channel was busy.

In particular, the proposed solution is well adapted to the communications on unlicensed frequency bands (NR-U).

According to a particular embodiment, the method also implements at least one step of storing, in one of the storage areas, a state representative of a transmission, by the base station, of at least one previous data packet and control information associated with said previous data packet, called previous transmission, said storage area being identified from the storage area indicator borne by the control information associated with the current data packet.

According to this embodiment, storing a state representative of a current transmission can be used to determine the state representative of a previous transmission.

For example, the storage areas of a memory are organised in a stack, and the method implements:
- the identification, from the storage area indicator borne by the control information associated with the current data packet, of a storage area of a state representative of the current transmission, corresponding to a current level in the stack,
- the determination, from the control information associated with the current data packet, that the control information associated with the previous data packet has not been received,
- the storage in at least one empty storage area corresponding to a level lower than the current level in the stack, of a state representative of the previous transmission indicating that the control information associated with the previous data packet has not been received.

According to a particular embodiment of the invention, the method implements:
- the detection, in the control information associated with the current data packet, of a reception indicator indicating that the base station has received all states representative of the previous transmissions, stored in the storage areas;
- the refreshing of the storage areas before storage of the state representative of the current transmission.

According to this embodiment, a new indicator is proposed, denoted for example NAI ("New Ack Indication"), allowing informing the terminal that the base station has received all states representative of the previous transmissions and that it is therefore possible to delete these states from the storage areas.

According to a particular embodiment, the terminal is associated with at least two memories.

When several memories are used, the storage area can be identified by a storage area indicator (denoted for example SetID) and by a memory indicator (denoted for example Ack_ID). The different memories can have a different number of storage areas.

In particular, each memory can be associated with a different quality of service level.

In another embodiment, the invention relates to a terminal capable of communicating with a base station, comprising at least one memory comprising at least two storage areas, and at least one processing unit configured to:
- store, in one of said storage areas, at least one state representative of a transmission, by the base station, of at least one current data packet and control information associated with the current data packet, called transmission current, said storage area being identified by a storage area indicator borne by the control information associated with the current data packet,
- transmit, to said base station, all states stored in the storage areas.

In particular, the processing unit is configured to store the states representative of the successive transmissions, and to transmit all these states when the terminal is authorised to emit.

For example, the processing unit is a processor operatively coupled to the memory or memories associated with the terminal.

Such a terminal is in particular adapted to implement the previously described method for managing a communication. This is, for example, user equipment such as a mobile phone. This terminal could of course include the different features relating to the method according to the invention, which can be combined or taken in isolation.

Thus, the features and advantages of this terminal are the same as those of the previously described method. Consequently, they are not further detailed.

The invention also relates, according to one embodiment, to a method of communication between a base station and a terminal. In particular, such a method is implemented at a base station.

According to this embodiment, the terminal being associated with at least one memory comprising at least two storage areas, the base station implements:
- at least one step of transmitting, to said terminal, at least one current data packet and control information associated with said current data packet, called current transmission, said control information bearing a storage area indicator identifying a storage area of a state representative of the current transmission, among the storage areas,
- the reception of all states representative of the transmissions, stored in the storage areas.

Thus, according to this embodiment, the base station knows, for each transmission, in which storage area the state of the transmission can be stored.

As already indicated, the proposed solution thus allows keeping in memory the states representative of the transmissions of data packets from the base station to the terminal, as long as the terminal is not authorised to emit. When the terminal is authorised to emit, the base station receives the states representative of the previous transmissions, and can decide whether it is desirable to retransmit some data packets.

According to a particular embodiment, the control information also bears at least one item of information belonging to the group comprising:
- a memory indicator (denoted for example Ack_ID) identifying a memory among said at least one memory associated with the terminal;
- a reception indicator (denoted for example NAI) indicating that the base station has received all stored states representative of the transmissions;
- at least one time/frequency resource intended to be used by the terminal to transmit to the base station all states representative of the transmissions (time/frequency resource allocated for the feedback).

In particular, the reception indicator changes state upon reception of all states representative of the transmissions, and is transmitted in the control information of a following transmission.

In this manner, the terminal can detect that the base station has received the states representative of the previous transmissions, and refresh the memory or memories associated therewith.

According to a particular embodiment, the memory being organised in a stack, the control information associated with the first data packet bears a storage area indicator identifying the storage area corresponding to the first level of the stack, and the control information associated with the following data packets respectively bears a storage area indicator identifying the storage area corresponding to the directly higher level.

In this manner, it is easier to detect the transmission failures when a storage area of the stack is empty.

According to one particular embodiment, the method implements:
- the identification of the transmission failures, from all received states representative of the transmissions;
- the retransmission of data packets and control information associated with the transmission failures.

According to one particular feature, when all storage areas of a memory among said at least one memory associated with the terminal are used, and that the states representative of the transmissions have not been received, the method implements a retransmission of all data packets and the control information associated with these data packets.

In this manner, it is ensured that the data packets will actually be received by the terminal.

In another embodiment, the invention relates to a base station capable of communicating with a terminal associated with at least one memory comprising at least two storage areas, said base station comprising at least one processing unit configured to:
- transmit, to the terminal, at least one current data packet and control information associated with said current data packet, called current transmission, said control information bearing a storage area indicator identifying a storage area of a state representative of the current transmission, among the storage areas,
- receive all states representative of the transmissions, stored in the storage areas.

In particular, the processing unit is configured to transmit data packets and control information, and to receive all states representative of the transmissions when the terminal is authorised to emit.

For example, the processing unit is a processor operatively coupled to a memory of the base station.

Such a base station is in particular adapted to implement the previously described communication method. This is for example an eNodeB. The base station could of course include the different features relating to the method according to the invention, which can be combined or taken in isolation. Thus, the features and advantages of the base station are the same as those of the previously described method. Consequently, they are not further detailed.

The invention also relates to one or more computer program(s) including instructions for implementing at least one method as described above when this or these program(s) are executed by at least one processor.

The invention also relates to an information medium readable by a computer, and including instructions of a computer program as mentioned above.

4. LIST OF FIGURES

Other features and advantages of the invention will emerge more clearly on reading the following description of a particular embodiment, given by way of simple illustrative and non-limiting example, and the appended drawings, among which:

FIG. 1 illustrates the main steps implemented by a base station according to one embodiment of the invention;

FIG. 2 illustrates the main steps implemented by a terminal according to one embodiment of the invention;

FIG. 3 illustrates the structure of different memories associated with a terminal according to one embodiment of the invention;

FIGS. 4A to 4D illustrate a first example of communication between a base station and a terminal according to one embodiment of the invention;

FIGS. 5A to 5E illustrate a second example of communication between a base station and a terminal according to one embodiment of the invention;

FIGS. 6A to 6D illustrate a third example of communication between a base station and a terminal according to one embodiment of the invention;

FIG. 7 shows the simplified structure of a terminal implementing a method for managing a communication according to one embodiment of the invention;

FIG. 8 shows the simplified structure of a base station implementing a communication method according to one embodiment of the invention.

5. DESCRIPTION OF AN EMBODIMENT OF THE INVENTION 5.1 General Principle

The general principle of the invention is based on the downlink transmission of data packets and control information associated with these data packets, i.e. from a base station to a terminal, and the storage in storage areas of a memory associated with the terminal, which are identified by the base station, of a state representative of each transmission.

It is thus possible for the terminal to transmit to the base station all states representative of the transmissions, when it is authorised to emit.

In this manner, upon receipt of all states representative of the transmissions, the base station can determine whether there has actually been one or more transmission failure(s), in which case it is necessary to retransmit the corresponding data packet and the control information associated therewith.

Relative to the techniques of the prior art, the base station does not assume that communication has been interrupted in the absence of a message on a time/frequency resource allocated for the feedback. The base station determines that the communication has been interrupted only when receiving a state representative of the transmission failure type transmission, such as DTX.

According to a particular embodiment, the terminal transmits to the base station all states stored in the storage areas when it is authorised to emit on a time/frequency resource identified from the control information, the control information bearing information relating to at least one time/frequency resource intended to be used by the terminal to transmit to the base station all states representative of the transmissions.

In particular, this information relating to at least one time/frequency resource for the feedback can be common to the control information associated with different data packets. In other words, the control information associated with different data packets identifies one (or more) same time/frequency resource to be used by the terminal for the feedback.

A communication network implementing at least one base station and at least one terminal is considered below. For example, the communication network is a cellular network.

With reference FIGS. 1 and 2, the main steps implemented by a terminal and a base station of the communication network, according to one embodiment of the invention, are presented.

It is considered that the terminal is associated with at least one memory. Such a memory can therefore be an internal component of the terminal, or an external component belonging to another equipment in communication with the terminal, such as a remote server. The address of such a memory can in particular be defined by a memory indicator, denoted for example Ack_ID. Such a memory comprises at least two storage areas. The address of each storage area can be defined by a storage area indicator, denoted for example SetID. In particular, the memory is a stack memory, and each storage area corresponds to a segment of the stack.

According to the embodiment illustrated in FIG. 1, the base station implements at least one step 11 of transmitting at least one data packet and control information associated with the data packet. The transmission of a current data packet from the base station to the terminal, for example on a PDSCH type channel, and of control information associated with the current data packet, for example of DCI type, is referred to as current transmission. Several transmission steps can be implemented to successively transmit the different data packets and control information associated thereto.

According to this embodiment, the control information bears a storage area indicator identifying a storage area of a state representative of the current transmission, among the storage areas of the memory associated with the terminal.

Thus, for each transmission of a new data packet, a different storage area can be allocated by the base station.

As illustrated in FIG. 2, the terminal implements, for its part, at least one step 21 of storing a state representative of a current transmission, i.e. of the transmission by the base station of at least one current data packet (for example on a PDSCH type channel) and control information (for example of DCI type) associated with the current data packet. According to this embodiment, the storage area is identified by the storage area indicator borne by the control information associated with the current data packet.

It should be noted that, in some cases, the reception of a current data packet and control information associated thereto allows storing, in one of the storage areas, a state representative of a previous transmission.

When the terminal is authorised to emit, it implements a transmission 22, to the base station, of all states S stored in the storage areas of at least one memory.

The base station, for its part, implements a step 12 of receiving all states S representative of the transmissions.

An example of implementation of the invention is described below, for a communication between a base station and a terminal on unlicensed frequency bands (for example NR-U).

As illustrated in FIG. 3, it is considered that the terminal is associated with one or more memories, identified by a memory indicator Ack_ID. When only one memory is associated with the terminal, such a memory indicator is optional. Each memory is divided into several segments, corresponding to different storage areas. Each storage area is identified by a storage area indicator Set_ID. The number of storage areas in each memory may be different. The memory Ack_ID can be considered as a buffer memory allowing storing the state representative of transmissions with an identifier (for example ACK if the data packet has been decoded, NACK if the data packet has not been decoded, or DTX if control information has not been received). The storage area indicator can be considered as a pointer to the buffer.

According to the embodiment described below, a reception indicator NAI is introduced, indicating that the base station has received all stored states representative of previous transmissions.

When the base station transmits control information (for example of DCI type) and a corresponding data packet (for example on the PDSCH), the control information bears the storage area indicator and possibly the memory and/or reception indicators.

According to the embodiment, the control information also allow identifying one or more time/frequency resource(s) for the feedback, intended to be used by the terminal to transmit, to the base station, all states representative of the transmissions.

For example, the NAI reception flag is a binary value (0 or 1) which indicates whether all states representative of transmissions, stored in the memory Ack_ID, have been received by the base station. For a current transmission, identifying a memory Ack_ID, if the value of the reception indicator is modified relative to the previous transmission identifying the same memory Ack_ID, this means that the base station has received all states representative of the transmissions, stored in the memory Ack_ID. Otherwise, this means that the base station has not yet received the representative states, stored in the memory Ack_ID.

By way of illustration, in relation to FIGS. 4A to 4D, a first example of communication between a base station and a terminal, according to one embodiment of the invention, is presented. For the first data transmission from the base station to the terminal, the base station identifies at least one memory associated with the terminal, for example a single memory identified by the indicator Ack_ID=0, a storage area, for example set=0, and a default value for the reception indicator, for example NAI=0. For example, the memory Ack_ID=0 comprises five storage areas organised in a stack, denoted set 0, set 1, set 2, set 3 and set 4.

As illustrated in FIG. 4A, for the transmission of the control information DCI and the first data packet on the PDSCH, called first transmission, the control information bears the parameters (Ack_ID=0, set=0, NAI=0).

If the terminal receives the control information DCI, it can store the state of the first transmission in the storage area identified in the control information. For example, the terminal has successfully received and decoded the first data packet. It therefore stores the ACK value in the storage area set=0 of the memory Ack_ID=0.

If the terminal is authorised to emit, it can transmit to the base station all states representative of the transmissions. For the first transmission, only one state is stored in the storage area set=0, therefore only one result can be transmitted to the base station if the terminal is authorised to emit.

It is noted that the storage and transmission steps can be implemented simultaneously or successively.

It is assumed that the terminal is not authorised to emit (failure of the LBT access protocol for example). It cannot therefore transmit its state ("ACK")—for example on the time/frequency resource allocated for the feedback.

As illustrated in FIG. 4B, the base station schedules the transmission of a second data packet on the PDSCH and associated control information DCI, called second transmission.

In particular, if the memory is organised in a stack, the control information associated with the first data packet bears a storage area indicator identifying the storage area corresponding to the first level of the stack (set=0), and the control information associated with the following data packets respectively bears a storage area indicator identifying the storage area corresponding to the directly higher level.

The control information associated with the second data packet then bears the parameters (Ack_ID=0, set=1, NAI=0).

If the terminal does not receive the control information DCI, it does not know that a second data packet has been emitted. It therefore does not store any information in the memory Ack_ID. The base station does not receive any information on the time/frequency resource allocated for the feedback.

It can be noted that if the terminal had received the control information DCI, it would have stored the state of the second transmission in the storage area set=1 identified in the control information. In addition, the terminal could have read the value of the reception indicator NAI and deduced therefrom that, since this value is identical to the value borne by the control information received during the previous transmission for the same memory, this means that the base station has not received the representative states of the previous transmissions. The terminal would therefore have stored the state of the second transmission in the storage area identified in the control information, set=1, and attempted to transmit all states representative of the transmissions.

As illustrated in FIG. 4C, the base station schedules the transmission of a third data packet on the PDSCH and associated control information DCI, called third transmission. The control information then bears the parameters (Ack_ID=0, set=2, NAI=0).

If the terminal receives the control information DCI, it can store the state of the third transmission in the set=2 storage area identified in the control information. For example, the terminal has not well decoded the PDSCH carrying the third data packet. It therefore stores the NACK value in the storage area set=2 of the memory Ack_ID=0.

In particular, especially if the memory is organised in a stack, the terminal can detect that at least one storage area of a level lower than the current storage area of the third data packet is empty, which means that the control information of a previous transmission (i.e. the second transmission) has not been received.

In the example illustrated in FIG. 4C, the terminal therefore stores in the empty storage area set=1 (corresponding to a level which is directly lower than the current level set=2 of the stack) a state representative of the previous transmission indicating that the control information associated with the previous data packet has not been received. For example, the value DTX is stored in the storage area set=1 which was left empty.

If the terminal is authorised to emit, it can transmit to the base station all states representative of the transmissions. For the third transmission, three states are stored in the storage area set=0 (ACK), set=1 (DTX) and set=2 (NACK), therefore three results can be transmitted to the base station if the terminal is authorised to emit. For example, these states are transmitted on one of the time/frequency resources allocated by the base station for the feedback.

More generally, the terminal transmits all the stored states of the storage area identified by the initial storage area indicator (set=0) to the storage area indicator of the last transmission identified in the control information of the current transmission (set=2).

As illustrated in FIG. 4C, it is assumed that the terminal is finally authorised to emit, for example following the successful execution of the LBT access protocol. The base station therefore receives all states stored in the memory Ack_ID=0, transmitted for example on one of the time/frequency resources allocated by the base station for the feedback.

As illustrated in FIG. 4D, following the reception of all the states stored in the memory Ack_ID=0 by the base station, the value of the indicator NAI goes from 0 to 1, and the base station schedules the transmission of a fourth data packet on the PDSCH and of associated control information DCI, called fourth transmission. The reception indicator therefore changes state upon reception of all states representative of the transmissions, and can be transmitted in the control information of a subsequent transmission.

As the states stored in the memory Ack_ID=0 have been received by the base station, it is possible to refresh the memory Ack_ID and return to storing the states representative of the transmissions. The control information then bears the parameters (Ack_ID=0, set=0, NAI=1).

In the example illustrated in FIG. 4D, it is assumed that the terminal receives the control information DCI. It detects in the control information associated with the current data packet (fourth data packet) a change of state of the reception indicator NAI (NAI=1), indicating that the base station has received all states representative of the previous transmissions.

The terminal flushes all storage areas of the memory Ack_ID=0, before storing the state representative of the current transmission (i.e. fourth transmission).

The terminal can then store the state of the fourth transmission in the storage area set=0 identified in the control information. For example, the terminal has decoded the PDSCH carrying the fourth data packet. It therefore stores the ACK value in the storage area set=0 of the memory Ack_ID=0.

With reference to FIGS. 5A to 5E, a second example of communication between a base station and a terminal, according to an embodiment of the invention, is now presented.

FIGS. 5A to 5C are identical to FIGS. 4A to 4C and are therefore not described in more detail.

As illustrated in FIG. 5C, at the end of the third transmission, three states are stored in the memory Ack_ID=0: ACK in the storage area set=0, DTX in the storage area set=1, and NACK in the storage area set=2. The terminal can transmit all states stored in the memory Ack_ID=0 when it is authorised to emit.

As illustrated in FIG. 5D, following the reception of all states stored in the memory Ack_ID=0 by the base station, the value of the indicator NAI goes from 0 to 1, and the base station schedules the transmission of a fourth data packet on the PDSCH and associated control information DCI, called fourth transmission.

As already indicated in relation to FIG. 4D, it is possible to refresh the memory Ack_ID and to return to storing the states representative of the transmissions since the states stored in the memory Ack_ID=0 have been received by the base station. The control information then bears the parameters (Ack_ID=0, set=0, NAI=1).

In the example illustrated in FIG. 5D, it is assumed that the terminal does not receive the control information DCI. The terminal therefore does not know that a fourth data packet has been emitted. It does not store any information in the memory Ack_ID, and the base station does not receive any information on the time/frequency resource allocated for the feedback.

As illustrated in FIG. 5E, the base station schedules the transmission of a fifth data packet on the PDSCH and associated control information DCI, called fifth transmission. The control information then bears the parameters (Ack_ID=0, set=1, NAI=1).

The terminal detects in the control information associated with the current data packet (fifth data packet) a change of state of the reception indicator NAI (NAI=1) relative to the last received control information (third transmission), indicating that the base station has received all states representative of the previous transmissions.

The terminal flushes all storage areas of the memory Ack_ID=0, before storing the state representative of the current transmission (i.e. fifth transmission).

If the terminal receives the control information DCI, it can store the state of the fifth transmission in the storage area set=1 identified in the control information. For example, the terminal has decoded the PDSCH carrying the fifth data packet. It therefore stores the ACK value in the storage area set=1 of the memory Ack_ID=0.

In particular, especially if the memory is organised in a stack, the terminal can detect that at least one storage area of a level lower than the storage area of the fifth data packet is empty, which means that the control information of the previous transmission (i.e. the fourth transmission) has not been received.

In the example illustrated in FIG. 5E, the terminal stores in the empty storage area set=0 a state representative of the previous transmission (i.e. the fourth transmission) indicating that the control information associated with the previous data packet has not been received. For example, the DTX value is stored in the storage area set=0.

If the terminal is authorised to emit, it can transmit to the base station all states representative of the transmissions. For the fifth transmission, two states are stored in the storage areas set=0 (DTX) and set=1 (ACK), therefore two results can be transmitted to the base station. For example, these states are transmitted on one of the time/frequency resources allocated by the base station for the feedback.

According to the illustrated examples, the base station can therefore detect, from the control information of a current transmission, a transmission failure of a previous transmission (i.e. when the terminal does not receive the control information).

In the case of a transmission failure (for example DTX state associated with a transmission), the base station can retransmit the corresponding data packets and the associated control information, possibly by adapting the coding rate and/or the modulation and coding scheme.

It can be noted that when all storage areas of a memory are used, and that the states representative of the transmissions have not been received, the base station implements a retransmission of all corresponding data packets and control information associated with these data packets. It is then possible to flush the memory.

In the two examples of communication described above, it was considered that a single memory was associated with a terminal. According to other examples, several memories can be associated with a terminal. In this case, the different memories can be used for different services with different quality of service (QoS) levels.

By way of example, it is considered that the user of the terminal has subscribed to two different services: a first service of the download type, tolerating a certain latency, and a second service of the mobile telephony type, requiring low latency.

Considering the use of a single memory, the states representative of the transmissions associated with the first service and the second service, stored in the single memory, are mixed. It is therefore difficult for the base station which receives all states to control the quality of service and the spectral efficiency of these two services. In particular, if the latency is to be low, the base station may decide not to wait to receive all states and assume, after a predetermined time, that all transmissions have failed (DTX). However, in this case, as the first service can withstand a greater latency than the second service, the base station could have waited longer to receive the states representative of the transmissions associated with the first service, before assuming that all the transmissions had failed.

Considering the use of two memories, one per service, it is possible to optimise the spectral efficiency. Indeed, as the base station can wait longer for the reception of the states representative of the transmissions associated with the first service (supporting a higher latency), it does not systematically consider a failure of the transmissions associated with the first service, and therefore does not necessarily retransmit the data packets associated with this first service.

FIGS. 6A to 6D illustrate a third example of communication between a base station and a terminal according to one embodiment of the invention, implementing two memories associated with a terminal, denoted for example Ack_ID=0 and Ack_ID=1. The memory Ack_ID=0 is associated with a first service tolerating a certain latency (service 1), and the memory Ack_ID=1 is associated with a second service requiring a low latency (service 2).

As illustrated in FIG. 6A, for the transmission of a first data packet on the PDSCH associated with the first service and the control information DCI associated therewith, the control information bears the parameters (Ack_ID=0, set=0, NAI=0).

For example, the terminal has received and decoded the first data packet associated with the first service. It therefore stores the ACK value in the storage area set=0 of the memory Ack_ID=0.

It is assumed that the terminal is not authorised to emit (failure of the LBT access protocol for example). It cannot therefore transmit its state ("ACK") to the base station.

As illustrated in FIG. 6B, for the transmission of a first data packet on the PDSCH associated with the second service and the associated control information DCI, the control information bears the parameters (Ack_ID=1, set=0, NAI=0).

For example, the terminal has received and decoded the first data packet associated with the second service. It therefore stores the ACK value in the storage area set=0 of the memory Ack_ID=1.

It is assumed that the terminal is still not authorised to emit.

As illustrated in FIG. 6C, for the transmission of a second data packet associated with the second service and the control information DCI associated therewith, the control information bears the parameters (Ack_ID=1, set=1, NAI=0).

For example, the terminal has received and decoded the second data packet associated with the second service. It therefore stores the ACK value in the storage area set=1 of the memory Ack_ID=1.

It is assumed that the terminal is still not authorised to emit.

Since the second service is associated with low latency, the base station may decide not to wait to receive all states and assume, after a predetermined time, that all transmissions associated with the second service have failed (DTX), and schedule a re-transmission of the corresponding data packets.

As illustrated in FIG. 6D, following this decision, the value of the indicator NAI goes from 0 to 1, and the base station schedules the re-transmission of the first data packet associated with the second service and the associated control information DCI.

As the base station will retransmit the data packets associated with the transmission failures, it is possible to refresh the memory Ack_ID=1 and to return to storing the states representative of the transmissions associated with the second service. The control information then bears the parameters (Ack_ID=1, set=0, NAI=1).

In particular, the memory associated with the low latency service may have a size, i.e. a number of storage areas, smaller than that of the memory associated with the service tolerating a higher latency.

Thus, when all storage areas of a memory associated with the low latency service are used, and the states representative of the transmissions have not been received by the base station, the base station implements a retransmission of all corresponding data packets associated with the low latency service and control information associated therewith.

More generally, it can be noted that the greater the number of storage areas in a memory associated with a terminal, the more the terminal can store states representative of the transmissions, and the longer the base station can wait before receiving all states. The spectral efficiency is thus optimised. When the last storage area of the memory is full, and the base station has still not received all states representative of the transmissions, this means that the load is high, i.e. the channel is heavily occupied. In this case, the base station assumes that all previous transmissions, corresponding to states stored in memory, have failed (DTX).

It is desirable to properly size the memories, taking in particular account of the latency tolerated for the considered service. For example, a memory comprising four or five storage areas can be used.

Moreover, in order to reduce the transmission latency of all states representative of the transmissions from the terminal to the base station, the base station can identify, in the control information, several time/frequency resources for the feedback. For example, the base station can allocate two time/frequency resources for a current transmission so that the terminal can report the state of the transmission. The terminal can then run the LBT access protocol on a first resource.

In case of success, the terminal can transmit the state of the transmission on this first resource. In case of failure, the terminal can run the LBT access protocol on the second resource. The probability of success of the LBT access protocol is thus optimised.

Finally, in relation to FIGS. 7 and 8, the simplified structures of a terminal and a base station, according to at least one embodiment described above, are presented.

As illustrated in FIG. 7, a terminal comprises at least one memory 71 comprising a buffer memory comprising at least two storage areas, at least one processing unit 72, equipped for example with a programmable computing machine or with a dedicated computing machine, for example a processor P, and driven by the computer program 73, implementing steps of the method for managing a communication according to at least one embodiment of the invention.

On initialisation, the code instructions of the computer program 73 are for example loaded into a RAM memory before being executed by the processor of the processing unit 72.

The processor of the processing unit 72 implements steps of the previously described method for managing a communication, according to the instructions of the computer program 73, to:
- store, in one of said storage areas, at least one state representative of a transmission, by the base station, of at least one current data packet and control information associated with the current data packet, called transmission current, said storage area being identified by a storage area indicator borne by the control information associated with the current data packet,
- transmit, to the base station, all states stored in the storage areas.

As illustrated in FIG. 8, such a base station comprises at least one memory 81 comprising a buffer memory, at least one processing unit 82, equipped for example with a programmable computing machine or with a dedicated computing machine, for example a processor P, and driven by the computer program 83, implementing steps of the communication method according to at least one embodiment of the invention.

On initialisation, the code instructions of the computer program 83 are for example loaded into a RAM memory before being executed by the processor of the processing unit 82.

The processor of the processing unit 82 implements steps of the previously described communication method, according to the instructions of the computer program 83, to:
- transmit, to a terminal, at least one current data packet and control information associated with the current data packet, called current transmission, the control information bearing a storage area indicator identifying a storage area of a state representative of the current transmission, among the storage areas of a memory associated with the terminal,
- receive all states representative of the transmissions, stored in said storage areas.

The invention claimed is:

1. A communication method of communication between a base station and a terminal, wherein said terminal is associated with at least one memory comprising at least two storage areas organised in a stack, and the method comprises said base station implementing:
   at least one step of transmitting to said terminal on a transmission channel at least one current data packet and control information associated with said current data packet, called a current transmission, said control information bearing a storage area indicator identifying a storage area of a state representative of the current transmission, among said storage areas, and corresponding to a current level in said stack, and
   receiving all states representative of the transmissions, stored in said storage areas, in response to the transmission channel between said terminal and said base station being considered as idle, and
   wherein receiving all the states comprises receiving a state representative of a previous transmission indicating that control information associated with a previous data packet has not been received by the terminal, which is stored in a storage area of the at least two storage areas, and corresponding to a level lower than said current level in the stack.

2. The communication method according to claim 1, wherein said control information also bears at least one item of information belonging to a group consisting of:
   a memory indicator identifying a memory among said at least one memory associated with the terminal;
   a reception indicator indicating that the base station has received all stored states representative of the transmissions;
   at least one time/frequency resource intended to be used by said terminal to transmit to the base station all states representative of the transmissions.

3. The communication method according to claim 2, wherein said reception indicator changes state upon reception of all states representative of the transmissions, and is transmitted in the control information of a following transmission.

4. The communication method according to claim 1, wherein, said memory being organised in a stack, the control information associated with the first data packet bears a storage area indicator identifying the storage area corresponding to the first level of the stack, and the control information associated with the following data packets respectively bears a storage area indicator identifying the storage area corresponding to the directly higher level.

5. The communication method according to claim 1, wherein the method comprises:
   identifying transmission failures, from all received states representative of the transmissions;
   retransmitting data packets and control information associated with the transmission failures.

6. The communication method according to claim 1, wherein when all storage areas of a memory among said at least one memory associated with the terminal are used, and the states representative of the transmissions have not been received, said method implements a retransmission of all data packets and the control information associated with these data packets.

7. A terminal capable of communicating with a base station, wherein said terminal comprises:
   at least one memory comprising at least two storage areas organised in a stack, and at least one processing unit configured to:
   store, in one of said storage areas, at least one state representative of a transmission, by the base station on a transmission channel, of at least one current data packet and control information associated with said current data packet, called a transmission current, said storage area being identified by a storage area indicator borne by said control information associated with said current data packet, and
   transmit, to said base station, all states stored in said storage areas, in response to the transmission channel between said terminal and said base station being considered as idle,
   store, in one of said storage areas, a state representative of a transmission, by the base station, of at least one previous data packet and control information associated with said previous data packet, called previous transmission, said storage area in which the state of the previous transmission is stored being identified from the storage area indicator borne by said control information associated with said current data packet;

identify, from the storage area indicator borne by said control information associated with the current data packet, the storage area of the state representative of the current transmission, corresponding to a current level in said stack, determine, from said control information associated with the current data packet, that the control information associated with a previous data packet has not been received, by detecting at least one empty storage area corresponding to a level lower than said current level in the stack, store in said at least one empty storage area corresponding to the level lower than said current level in the stack, the state representative of a previous transmission indicating that the control information associated with a previous data packet has not been received.

8. A base station capable of communicating with a terminal associated with at least one memory comprising at least two storage areas organised in a stack, wherein said base station comprises:

at least one processing unit configured to:

transmit, to the terminal on a transmission channel, at least one current data packet and control information associated with said current data packet, called a current transmission, said control information bearing a storage area indicator identifying a storage area of a state representative of the current transmission, among said storage areas, and corresponding to a current level in said stack, and receive all states representative of the transmissions, stored in said storage areas, in response to the transmission channel between said terminal and said base station being considered as idle, and wherein receiving all the states comprises receiving a state representative of a previous transmission indicating that control information associated with a previous data packet has not been received by the terminal, which is stored in a storage area of the at least two storage areas, and corresponding to a level lower than said current level in the stack.

9. A method for managing a communication between a base station and a terminal, wherein said terminal is associated with at least one memory comprising at least two storage areas, and the method comprises said terminal implementing:

at least one step of storing, in one of said storage areas, a state representative of a transmission, by the base station on a transmission channel, of at least one current data packet and control information associated with said current data packet, called a current transmission, said storage area being identified by a storage area indicator borne by said control information associated with said current data packet;

transmitting, to said base station, all states stored in said storage areas, in response to the transmission channel between said terminal and said base station being considered as idle;

at least one step of the terminal storing, in one of said storage areas, a state representative of a transmission, by the base station, of at least one previous data packet and control information associated with said previous data packet, called previous transmission, said storage area in which the state of the previous transmission is stored being identified from the storage area indicator borne by said control information associated with said current data packet;

wherein said storage areas of the at least one memory are organised in a stack, and said method implements:

identifying, from the storage area indicator borne by said control information associated with the current data packet, the storage area of the state representative of the current transmission, corresponding to a current level in said stack, determining, from said control information associated with the current data packet, that the control information associated with a previous data packet has not been received, by detecting at least one empty storage area corresponding to a level lower than said current level in the stack, storing in said at least one empty storage area corresponding to the level lower than said current level in the stack, the state representative of a previous transmission indicating that the control information associated with a previous data packet has not been received.

10. The method according to claim 9, wherein the method comprises:

detecting, in said control information associated with the current data packet, a reception indicator indicating that the base station has received all states representative of the previous transmissions, stored in said storage areas;

refreshing said storage areas before storage of the state representative of the current transmission, in response to detecting the reception indicator.

11. The method according to claim 9, wherein said terminal is associated with at least two memories, each memory being associated with a different quality of service level.

12. The method according to claim 9, wherein said state representative of a transmission belongs to a group consisting of:

the current data packet has been decoded;
the current data packet has not been decoded;
the control information has not been received.

* * * * *